(12) United States Patent
Lavoie et al.

(10) Patent No.: US 12,093,037 B2
(45) Date of Patent: Sep. 17, 2024

(54) REMOTE CONTROL SYSTEM FOR A VEHICLE AND TRAILER

(71) Applicant: Ford Global Technologies, LLC, Dearborn, MI (US)

(72) Inventors: Erick Lavoie, Van Buren Charter Township, MI (US); Hamid Golgiri, Livonia, MI (US); Bo Bao, Bloomfield, MI (US); Siyuan Ma, Detroit, MI (US); Hemanth Yadav Aradhyula, Farmington Hills, MI (US); Seyed Armin Raeis Hosseiny, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 309 days.

(21) Appl. No.: 17/336,822

(22) Filed: Jun. 2, 2021

(65) Prior Publication Data
US 2022/0390942 A1      Dec. 8, 2022

(51) Int. Cl.
*G05D 1/00*          (2024.01)
*B60W 30/18*        (2012.01)
*G06F 3/04847*     (2022.01)

(52) U.S. Cl.
CPC ..... *G05D 1/0044* (2013.01); *B60W 30/18145* (2013.01); *G06F 3/04847* (2013.01); *B60W 2300/14* (2013.01)

(58) Field of Classification Search
CPC ........ G05D 1/0044; G05D 2201/0213; B60W 30/18145; B60W 2300/14; G06F 3/04847; B60K 2370/1438; B60K 2370/566; B60K 2370/573; B60K 35/00; B60K 37/06; G05B 19/0423; G05B 2219/23051
See application file for complete search history.

(56) References Cited

U.S. PATENT DOCUMENTS

| | | | |
|---|---|---|---|
| 8,584,043 B2 * | 11/2013 | Cho | G06F 3/0488 715/814 |
| 2017/0073004 A1 | 3/2017 | Shepard | |
| 2020/0097001 A1 * | 3/2020 | Lavoie | G06F 3/04817 |
| 2020/0110402 A1 * | 4/2020 | Golgiri | G05D 1/0044 |
| 2020/0247471 A1 * | 8/2020 | Grodde | G06V 20/58 |
| 2020/0393825 A1 | 12/2020 | Golgiri et al. | |
| 2020/0393826 A1 | 12/2020 | Golgiri et al. | |

OTHER PUBLICATIONS

Heinrich Gotzig, "Parking Assistance", Valeo Schalter und Sensoren GmbH, Driving Assistance Product Group, Bietigheim-Bissingen, Germany, 16 pages. Copyright Springer International Publishing, Switzerland, Handbook of Driver Assistance Systems, 2016.

* cited by examiner

*Primary Examiner* — Tyler J Lee
*Assistant Examiner* — Kimia Kohankhaki
(74) *Attorney, Agent, or Firm* — Frank Lollo; Eversheds Sutherland (US) LLP

(57) ABSTRACT

A mobile device for remotely controlling the movement of a vehicle and trailer is provided. The mobile device provides a user engagement input for display and use of a control input. The control input may be used to generate a signal for controlling the movement of the vehicle and trailer.

17 Claims, 4 Drawing Sheets

REMOTE CONTROL SYSTEM FOR A VEHICLE AND TRAILER

BACKGROUND

Operating a vehicle with a trailer in tow can be very challenging for many drivers. This is particularly true for drivers that are unskilled at backing up vehicles with attached trailers. Such drivers may include those that drive with a trailer on an infrequent basis (e.g., drivers that rent a trailer). For example, when manually reversing a trailer, the direction of the steering wheel input may be counterintuitive to the resulting trailer direction.

A system with a remote device may be used to assist with operating a vehicle with an attached trailer. It is desired that the operation of the vehicle with the system is done when the user is actively using the remote device. It is with respect to these and other considerations that the disclosure made herein is presented.

DESCRIPTION OF THE FIGURES

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The systems and methods disclosed herein are configured to provide a mobile device for remotely controlling the movement of a vehicle and trailer. The mobile device provides a user engagement input for display and use of a control input. The control input may be used to generate a signal for controlling the movement of the vehicle and trailer.

Figure 1:
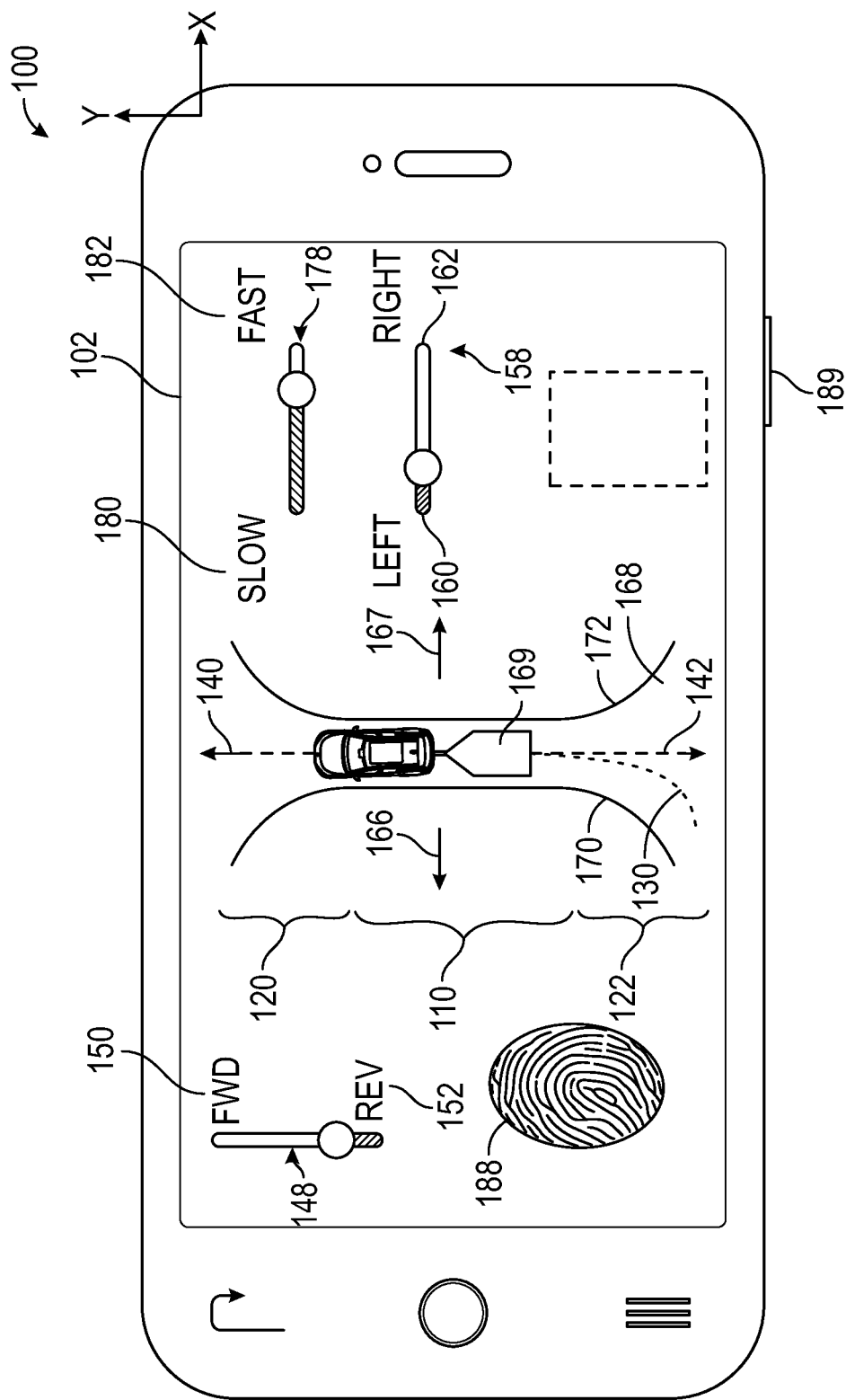
FIG. 1 depicts a mobile device of a vehicle control system for controlling the vehicle in accordance with the present disclosure.

Referring to FIG. 1, a mobile device 100 includes a display 102. For example, the display 102 is a touchscreen display and the mobile device 100 is configured to display inputs that can be selected or manipulated through contact with or gestures on the display 102.

Referring to FIG. 1, a mobile device 100 displays a vehicle graphic 110 that represents a vehicle and a trailer. The mobile device 100 also displays path graphics 120, 122 that extend from the vehicle graphic 110.

The path graphics 120, 122 represent controlled movement of a vehicle and trailer along a path 130 in one of a forward direction 140 (e.g., forward path graphic 120 aligned with a front end of vehicle graphic 110) and a reverse direction 142 (e.g., reverse path graphic 122 aligned with a back end of vehicle graphic 110).

The mobile device 100 may display one of the forward path graphic 120 and the reverse path graphic 122 based on a setting of a directional input 148 that includes a forward setting 150 and a reverse setting 152. For example, when the directional input 148 is set to the forward setting 150, the mobile device 100 displays the forward path graphic 120 and when the directional input 148 is set to the reverse setting 152 the mobile device 100 displays the reverse path graphic 122.

The mobile device 100 includes a number of vehicle motion inputs that provide vehicle motion settings. The vehicle may be controlled based on the vehicle motion settings.

The mobile device 100 includes a curvature input 158 that includes a leftmost setting 160, a rightmost setting 162, and a straight line setting 164. For example, the curvature input 158 can be set to alter the curvature of the path 130 and thereby move the vehicle and trailer in a left direction 166, in a straight line, or in a right direction 167.

The curvature input 158 may include various degrees of curvature between the straight line setting 164 and each of the leftmost setting 160 and the rightmost setting 162. The degrees of curvature define the curvature of the path 130.

The curvature input 158 may alternatively be the trailer 169 of the vehicle graphic 110. For example, the trailer 169 may be dragged to the left 166 or the right 167 to provide a curvature setting.

Each of path graphics 120, 122 display a range of possible paths 130. For example, a shaded area 168 is displayed between edges including a leftmost path 170 and a rightmost path 172. The leftmost path 170 corresponds to the leftmost setting 160 of the curvature input 158 and the rightmost path 172 corresponds to the rightmost setting 162 of the curvature input 158. The path 130 is otherwise in the shaded area 168 depending on the setting of the curvature input 158 with a straight path 130 in the center of the area 168 when the curvature input 158 is at the straight line setting 164.

The mobile device 100 may further include a speed input 178. For example, the speed input 178 includes a slow setting 180 and a fast setting 182. In some examples, the speed setting may be determined based on a measurement of pressure (e.g., a relative size of an area of contact on the display) on the control input 190. For example, a smaller pressure or area may be associate with a slow setting and a larger pressure or area may be associated with a faster setting.

The inputs 148, 158, 178 are illustrated in FIG. 1 as a slide input but may alternatively be another type of input such as a dial input. Alternatively, one or more of a curvature input, speed input, directional input may be provided through orientation of the mobile device. For example, the mobile device may be rotated about an axis to change a setting of one of a curvature input and a speed input. As described in further detail below, the mobile device includes sensors and the orientation of the mobile device can be determined from measurements from the sensors.

The mobile device 100 further includes a user engagement input 188. The user engagement input 188 is a separate input and is contacted to reveal or hide a control input 190. In operation, referring to FIG. 2, when a user (e.g., user's thumb) is in contact with the user engagement input 188, the mobile device 100 provides or displays the control input 190. Referring to FIG. 1, when a user is not in contact with the engagement input 188, the mobile device 100 removes or hides the control input 190.

The user engagement input may alternatively or additionally a physical button 189 (e.g., volume) of the mobile device 100 that is depressed to reveal the control input 190.

After contacting the user engagement input 188, a user may contact the control input 190 to control the vehicle (e.g., generates a control signal that is transmitted to a vehicle control system) according to the settings of the inputs 148, 158, 178. The mobile device 100 disables control of a vehicle (e.g., ceases or prevents generation of a control signal) when the user de-contacts the control input 190 or the engagement input 188.

The user engagement input 188 acts as a mechanism to verify that the user is engaged with the mobile device 100 before allowing control of a vehicle. The control input 190 can be used to selectively control the vehicle when a user is engaged with the mobile device 100.

These and other advantages of the present disclosure are provided in greater detail herein.

Illustrative Embodiments

The disclosure will be described more fully hereinafter with reference to the accompanying drawings, in which exemplary embodiments of the disclosure are shown, and not intended to be limiting.

Figure 3:
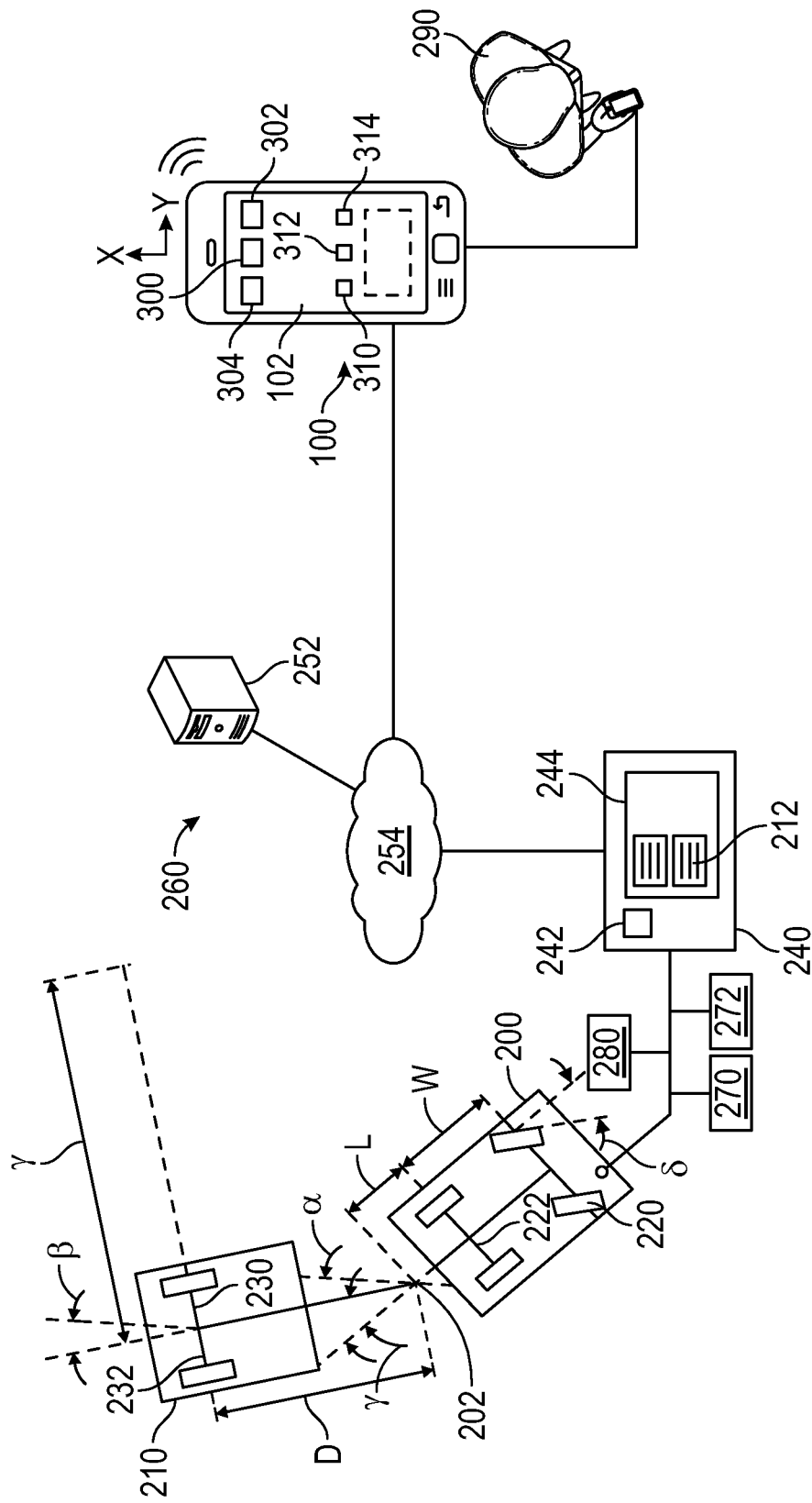
FIG. 3 is a schematic illustration of a vehicle control system including the mobile device of FIG. 1, a vehicle, and a trailer in accordance with the present disclosure.
Figure 4:
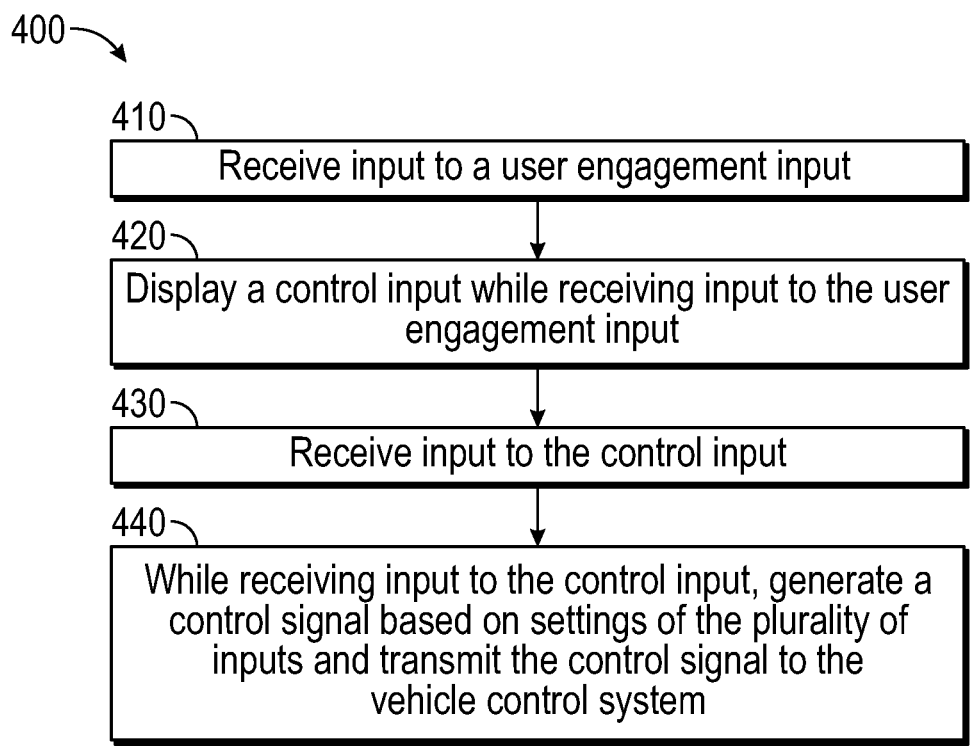
FIG. 4 is a flow chart of an exemplary method in accordance with the present disclosure.

FIG. 3 illustrates a vehicle 200. The vehicle 200 includes a hitch 202 (also referred to as a tow hitch, a tow bar, a trailer hitch, hitch point etc.) that is located at the back end of the vehicle 200. For example, the hitch 202 is coupled to and extends from a chassis of the vehicle 200.

The vehicle 200 may take the form of another passenger or commercial automobile such as, for example, a truck, a car, a sport utility vehicle, a crossover vehicle, a van, a minivan, a taxi, a bus, etc., and may be configured to include various types of automotive drive systems. Example drive systems can include various types of internal combustion engine (ICE) powertrains having a gasoline, diesel, or natural gas-powered combustion engine with conventional drive components such as, a transmission, a drive shaft, a differential, etc.

In another configuration, the vehicle 200 may be configured as an electric vehicle (EV). More particularly, the vehicle 200 may include a battery EV (BEV) drive system. The vehicle 200 may be configured as a hybrid EV (HEV) having an independent onboard power plant or a plug-in HEV (PHEV) that includes a HEV powertrain connectable to an external power source (including a parallel or series hybrid powertrain having a combustion engine power plant and one or more EV drive systems). HEVs can include battery and/or super capacitor banks for power storage, flywheel power storage systems, or other power generation and storage infrastructure.

The vehicle 200 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Further, the vehicle 200 may be a manually driven vehicle, and/or be configured to operate in a fully autonomous (e.g., driverless) mode (e.g., level-5 autonomy) or in one or more partial autonomy modes. Examples of partial autonomy modes are widely understood in the art as autonomy Levels 1 through 5.

An autonomous vehicle (AV) having Level-1 autonomy may generally include a single automated driver assistance feature, such as steering or acceleration assistance. Adaptive cruise control is one such example of a Level-1 autonomous system that includes aspects of both acceleration and steering.

Level-2 autonomy in vehicles may provide partial automation of steering and acceleration functionality, where the automated system(s) are supervised by a human driver that performs non-automated operations such as braking and other controls.

Level-3 autonomy in a vehicle can generally provide conditional automation and control of driving features. For example, Level-3 vehicle autonomy typically includes "environmental detection" capabilities, where the vehicle can make informed decisions independently from a present driver, such as accelerating past a slow-moving vehicle, while the present driver remains ready to retake control of the vehicle if the system is unable to execute the task.

Level-4 autonomy includes vehicles having high levels of autonomy that can operate independently from a human driver, but still include human controls for override operation. Level-4 automation may also enable a self-driving mode to intervene responsive to a predefined conditional trigger, such as a road hazard or a system failure.

Level-5 autonomy is associated with autonomous vehicle systems that require no human input for operation, and generally do not include human operational driving controls.

A trailer 210 is coupled to the vehicle 200 via the hitch (e.g., hitch point 202) such that the vehicle 200 is able to pull or push the trailer 210 from one location to another location. Trailers are utilized for various purposes including hauling objects (e.g., other vehicles or boats), moving, and camping.

The hitch 202 is configured to receive a trailer connector (as illustrated, located at the front end) of the trailer 210 to couple the trailer 210 to the vehicle 200. The hitch 202 allows the trailer 210 to rotate. The trailer 210 follows the path of the vehicle 200 when the vehicle 200 moves forward. The path of the trailer 210 when the vehicle 200 moves in reverse depends on the direction of force (e.g., due to steering angle) applied by the vehicle 200 at the hitch 202 among other factors described in further detail below with respect to a kinematic model 212.

A kinematic model may be used to illustrate a relationship between a curvature of a path 130 of travel of the trailer 210 and a steering angle of the vehicle 200. For purposes of description, a low order kinematic model is described in which certain assumptions are made with regard to some parameters. Such assumptions may include, but are not limited to, the trailer 210 is backed up by the vehicle 200 at a relatively low speed, the wheels of the vehicle 200 and the wheels of the trailer 210 have negligible slip, the vehicle 200 and the trailer 210 have negligible lateral compliance, the tires of the vehicle 200 and the trailer 210 have negligible deformation, the actuator dynamics of the vehicle 200 are negligible, and the vehicle 200 and the trailer 210 exhibit negligible roll or pitch motions.

As shown in FIG. 3, a kinematic model of the vehicle 200 and the trailer 210 is based on various parameters associated with the vehicle 200 and the trailer 210.

These kinematic model parameters include: steering angle (delta $\delta$) of front wheels 220 of the vehicle 200; yaw angle (alpha $\alpha$) of the vehicle 200; yaw angle (beta $\beta$) of the trailer 210; hitch angle (gamma $\gamma$) (gamma=beta−alpha); wheel base (W) of the vehicle 200; length (L) between the hitch point 202 and a rear axle 222 of the vehicle 200; length (D) between the hitch point 202 and an axle 230 of the trailer 210; and a radius of curvature (r) at a midpoint 232 of the axle 230 of the trailer 210.

The kinematic model 212 provides a relationship between the radius of curvature (r), the steering angle (delta), and the hitch angle (gamma). The radius of curvature (r) relates to the curvature of a trailer path of the trailer 210. In particular, as shown in the equation below, this relationship can be expressed to provide a trailer path curvature (kappa) such that, if hitch angle (gamma) is given (e.g., measured), the trailer path curvature (kappa) can be controlled based on controlling the steering angle (delta), for example, with a steering system 270.

$$\kappa = \frac{1}{r} = \frac{\dot{\beta}}{\dot{\eta}} = \frac{\left(W + \frac{KV^2}{g}\right)\sin\gamma + L\cos\gamma\tan\delta}{D\left(\left(W + \frac{KV^2}{g}\right)\cos\gamma - K\sin\gamma\tan\delta\right)}$$

Here, β dot (derivative of beta) is a trailer yaw rate and η dot (derivative of eta) is a trailer velocity. This relationship can also be used to provide the steering angle (delta), for example, for the steering system 270 to achieve. Here, the steering angle (delta) is a function of trailer path curvature (kappa), which is input to the trailer backup assist system 272, and the hitch angle (gamma), which is measured.

$$\delta = \tan^{-1}\left(\frac{\left(W + \frac{KV^2}{g}\right)[\kappa D\cos\gamma - \sin\gamma]}{DL\kappa\sin\gamma + L\cos\gamma}\right)$$

For a particular vehicle 200 and trailer 210 combination, certain kinematic model parameters (e.g., D, W and L) are constant and assumed known. V is the vehicle longitudinal speed and g is the acceleration due to gravity. K is a speed dependent parameter which when set to zero makes the calculation of steering angle independent of vehicle speed. For example, vehicle-specific kinematic model parameters can be predefined in an electronic control system of a vehicle 200 and trailer-specific kinematic model parameters can be inputted by a user of the vehicle 200.

The vehicle 200 includes an automotive computer 240. The automotive computer 240 may be or include an electronic vehicle controller. The automotive computer 240 may be installed in an engine compartment of the vehicle 200 as schematically illustrated or elsewhere in the vehicle 200.

The automotive computer 240 may include one or more processor(s) 242 and a computer-readable memory 244. The one or more processor(s) 242 may be disposed in communication with one or more memory devices disposed in communication with the respective computing systems (e.g., the memory 244 and/or one or more external databases). The processor(s) 242 may utilize the memory 244 to store programs in code and/or to store data for performing aspects of methods in accordance with the disclosure (e.g., kinematic model 212 and method 400).

The memory 244 may be a non-transitory computer-readable memory storing program code. The memory 244 can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

The automotive computer 240 may be disposed in communication with the mobile device 100 and one or more server(s) 252 via a network 254. Each of the mobile device 100 and the server 252 may include a processor and a memory as described above.

The network(s) 254 illustrate an example communication infrastructure in which the connected devices may communicate. The network(s) 254 may be and/or include the Internet, a private network, public network or other configuration that operates using any one or more known communication protocols such as, for example, transmission control protocol/Internet protocol (TCP/IP), Bluetooth®, Wi-Fi based on the Institute of Electrical and Electronics Engineers (IEEE) standard 802.11, Ultra-Wide Band (UWB), and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

The vehicle control system 260 may include the automotive computer 240, the mobile device 100, the server 252, and the like. The vehicle control system 260 may be configured or programmed to control or enable and disable one or more vehicle subsystems. Examples of subsystems that may be controlled include the steering system 270 (e.g., one or more systems for controlling braking, ignition, steering, acceleration, transmission control, and/or other control mechanisms) and the trailer backup assist system 272. The vehicle control system 260 may control the subsystems based, at least in part, on data generated by sensors 280.

The sensors 280 may include sensors to measure parameters of the kinematic model 212 including the yaw angle (alpha) of the vehicle, the yaw angle (beta) of the trailer, the steering angle (delta) of the vehicle, and the like. For example, the yaw angle sensors may include a compass or magnetometer.

The sensors 280 may also include autonomous driving sensors, which include any number of devices configured or programmed to generate signals that help navigate the vehicle 200 while the vehicle 200 is operating in an autonomous (e.g., driverless) mode. Examples of autonomous driving sensors 280 include a Radio Detection and Ranging (RADAR or "radar") sensor configured for detection and localization of objects using radio waves, a Light Detecting and Ranging (LiDAR or "lidar") sensor, a vision sensor system having trajectory, obstacle detection, object classification, augmented reality, and/or other capabilities, and/or the like.

The vehicle control system 260 (e.g., processor 242) may calculate certain parameters of the kinematic model 112 including a jackknife angle, a hitch angle (gamma), a distance from a hitch angle (gamma), a radius of curvature of the trailer or trailer path curvature (kappa), and the like.

The vehicle control system 260 may determine when the trailer 210 is connected to the vehicle 200 via a calculation of resistance or change in resistance (e.g., a change in resistance on a circuit to which a 4-pin or 7-pin connector may be connected), calculation of a load, computer vision, and the like.

The trailer backup assist system 272 is configured to receive an input to select a trailer path curvature (e.g., kappa) according to where the user wants the trailer 210 to go, calculate a steering angle (delta) (including measuring the necessary parameters of the kinematic model with the sensors 280), and generate steering commands to achieve the steering angle (delta) with the steering system 270 (e.g., electric power assisted steering (EPAS) system). To receive an input to select a trailer path curvature (kappa), the trailer backup assist system 272 may receive an input from the curvature input 158 of the mobile device 100.

More generally, the movement of the vehicle 200 and trailer 210 may be remotely controlled by a user 290 using the mobile device 100. The mobile device 100 generally includes a memory 300 and a processor 302. The memory 300 stores an application 304 including program instructions that, when executed by the mobile device processor 302, performs aspects of the disclosed embodiments. The application 304 may be part of a vehicle control system described herein or may provide and or receive information from the vehicle control system.

Figure 2:
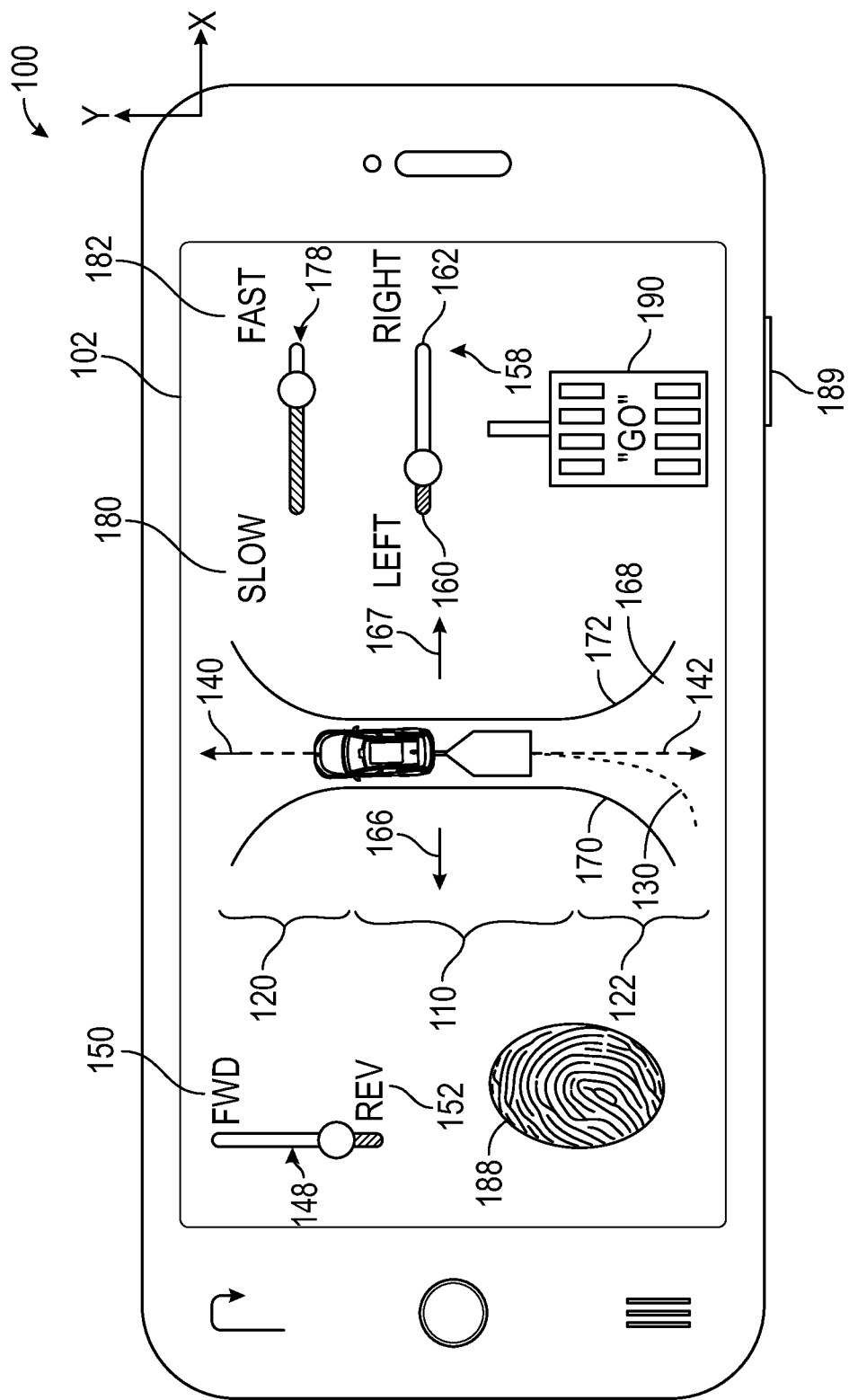
FIG. 2 depicts the mobile device of FIG. 1 in accordance with the present disclosure.

Referring to FIGS. 1-2, the mobile device 100 includes the display 102. For example, the display 102 is a touch-screen display and the mobile device 100 is configured to display inputs that can be selected or manipulated through contact with or gestures on the display 102.

The mobile device 100 displays a vehicle graphic 110 that represents a vehicle and a trailer. The mobile device 100 also displays path graphics 120, 122 that extend from the vehicle graphic 110.

The path graphics 120, 122 represent controlled movement of the vehicle 200 and the trailer 210 along a path 130 in one of a forward direction 140 (e.g., forward path graphic 120 aligned with a front end of vehicle graphic 110) and a reverse direction 142 (e.g., reverse path graphic 122 aligned with a back end of vehicle graphic 110).

The mobile device 100 may display one of the forward path graphic 120 and the reverse path graphic 122 based on a setting of a directional input 148 that includes a forward setting 150 and a reverse setting 152. For example, when the directional input 148 is set to the forward setting 150, the mobile device 100 displays the forward path graphic 120 and when the directional input 148 is set to the reverse setting 152 the mobile device 100 displays the reverse path graphic 122.

The mobile device 100 further includes a curvature input 158 that includes a leftmost setting 160, a rightmost setting 162, and a straight line setting 164. The curvature input 158 may include various degrees of curvature between the straight line setting 164 and each of the leftmost setting 160 and the rightmost setting 162. The degrees of curvature define the curvature of the path 130.

The curvature input 158 may alternatively be the trailer 169 of the vehicle graphic 110. For example, the trailer 169 may be dragged to the left 166 or the right 167 to provide a curvature setting.

Each of path graphics 120, 122 display a range of possible paths 130. For example, a shaded area 168 is displayed between edges including a leftmost path 170 and a rightmost path 172. The leftmost path 170 corresponds to the leftmost setting 160 of the curvature input 158 and the rightmost path 172 corresponds to the rightmost setting 162 of the curvature input 158. The path 130 is otherwise in the shaded area 168 depending on the setting of the curvature input 158 with a straight path 130 in the center of the area 168 when the curvature input 158 is at the straight line setting 164.

The mobile device 100 may further include a speed input 178. For example, the speed input 178 includes a slow setting 180 and a fast setting 182. The mobile device 100 may further include a speed input 178. In some examples, the speed setting may be determined based on a measurement of pressure (e.g., a relative size of an area of contact on the display) on the control input 190. For example, a smaller pressure or area may be associate with a slow setting and a larger pressure or area may be associated with a faster setting.

The vehicle motion inputs may be alternatively or additionally provided via orientation of the mobile device 100. In particular, the speed input 178 may be provided by rotating the mobile device 100 forward or backward (e.g., rotation about the x-axis) and the curvature input may be provided by turning the mobile device 100 (e.g., rotation about a z-axis) or rotating the mobile device to one side or another (e.g., rotation about the y-axis).

An x-axis, y-axis, and z-axis may be defined with respect to the mobile device 100. Here, as the geometry of the mobile device 100 is rectangular, the x-axis aligns with a horizontal dimension of the mobile device 100 and the y-axis aligns with a vertical dimension of the mobile device 100. The x-axis and the y-axis define an x-y plane that is parallel, for example, to the surface of the user interface or display 102 of the mobile device 100. The z-axis is orthogonal to the x-y plane.

Referring to FIG. 3, the mobile device 100 further includes sensors including an accelerometer 310, a gyroscope 312, and a magnetometer 314 (e.g., compass sensor).

The accelerometer 310 measures linear acceleration and the acceleration of gravity (ag). In particular, the accelerometer measures components of the overall acceleration along the x-axis, y-axis, and z-axis. The gyroscope 312 measures angular velocity. In particular, the gyroscope measures angular velocity around each of the x-axis, y-axis, and z-axis. The magnetometer 314 measures earth's magnetic fields and provides a heading. In particular, the magnetometer measures components of the overall magnetic field along the x-axis, y-axis, and z-axis. One or more of the sensors may determine the orientation of the mobile device 100.

The mobile device 100 further includes the user engagement input 188. The user engagement input 188 may be a separate input and is contacted to reveal or hide the control input 190. In operation, referring to FIG. 2, when a user (e.g., user's thumb) is in contact with the user engagement input 188, the mobile device 100 provides or displays a control input 190. Referring to FIG. 1, when a user is not in contact with the engagement input 188, the mobile device 100 removes or hides the control input 190.

User engagement input 188 may alternatively or additionally a physical button (e.g., volume) of the mobile device 100 that is depressed to reveal the control input 190.

After contacting the user engagement input 188, a user may contact the control input 190 to control the vehicle (e.g., generates a control signal) according to the settings of the inputs 148, 158, 178. The mobile device 100 disables control of a vehicle (e.g., ceases or prevents generation of a control signal) when the user de-contacts the control input 190 or the engagement input 188.

The user engagement input 188 acts as a mechanism to verify that the user is engaged with the mobile device 100 before allowing control of a vehicle. The control input 190 can be used to selectively control the vehicle when a user is engaged with the mobile device 100.

According to a first step 410 of an exemplary method 400, the mobile device 100 receives an input to the user engagement input 188.

According to a second step 420, while the mobile device 100 receives input to the user engagement input 188, the mobile device 100 displays the control input 190.

According to a third step 430, the mobile device 100 receives input to the control input 190.

According to a fourth step 440, in response to the mobile device 100 receiving contact with the user engagement input 188 and the control input 190, the mobile device generates a control signal based on vehicle motion settings and transmits the control signal to the vehicle control system 260. The vehicle control system 260 controls the vehicle 200 based on the control signal. The plurality of inputs including the curvature input 158, the directional input 148, the speed input 178, and the user engagement input 188.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A method for controlling a vehicle with a mobile device, comprising:
    displaying, via a display of the mobile device, a first graphic and one or more second graphics, the first graphic being a user engagement graphic and the one or more second graphics being one or more input graphics for providing a vehicle motion setting;
    receiving an input to the user engagement graphic presented via the display of the mobile device;
    displaying, only while the mobile device receives the input to the user engagement graphic, a third graphic on the display of the mobile device, the third graphic being a control input graphic;
    generating, only while receiving an input to both the user engagement graphic and the control input graphic, a control signal for the vehicle based on the provided vehicle motion setting; and
    removing, based on a determination that the mobile device does not receive the input to the user engagement graphic, the control input graphic from the display to prevent the control signal from being transmitted to the vehicle.

2. The method of claim 1, wherein the user engagement graphic is at least one of an input displayed on the display and/or a physical button of the mobile device.

3. The method of claim 1, wherein the one or more input graphics for the vehicle motion setting include at least one of: a curvature input graphic, a directional input graphic, or a speed input graphic.

4. The method of claim 3, wherein the one or more input graphics for the vehicle motion setting include at least one of a slide input graphic and/or a dial input graphic.

5. The method of claim 1, wherein the input for the vehicle motion setting is based on an orientation of the mobile device.

6. The method of claim 1, further comprising displaying on the display:
    a vehicle graphic; and
    a vehicle path graphic located at a front end and/or a back end of the vehicle graphic, wherein the vehicle path graphic is based on the input of the vehicle motion setting.

7. The method of claim 6, wherein the vehicle path graphic includes a path, and wherein a curvature of the path is based on a setting of a curvature input.

8. The method of claim 7, wherein the vehicle path graphic includes edges that correspond to settings at maximum curvature limits of the curvature input.

9. The method of claim 7, wherein the curvature input includes a trailer of the vehicle graphic, wherein the trailer is configured to be dragged left or right to provide a curvature setting.

10. The method of claim 1, wherein the control input graphic provides a speed input.

11. The method of claim 10, wherein a speed setting is determined based on a measurement of pressure on the control input graphic.

12. A mobile device, comprising:
a display;
a processor; and
a memory comprising computer executable instructions that, when executed by the processor, cause the processor to:
 display, via a display of the mobile device, a first graphic and one or more second graphics, the first graphic being a user engagement graphic and the one or more second graphics being one or more input graphics for providing a vehicle motion setting;
 receive an input to the user engagement graphic presented via the display of the mobile device;
 display, only while the mobile device receives the input to the user engagement graphic, a third graphic on the display of the mobile device, the third graphic being a control input graphic;
 generate, only while receiving an input to both the user engagement graphic and the control input graphic, a control signal for a vehicle based on the provided vehicle motion setting; and
 remove, based on a determination that the mobile device does not receive the input to the user engagement graphic, the control input graphic from the display to prevent the control signal from being transmitted to the vehicle.

13. The mobile device of claim 12, wherein the user engagement graphic is displayed on the display and/or is a physical button of the mobile device.

14. The mobile device of claim 12, wherein the memory comprises computer executable instructions that, when executed by the processor, wherein the one or more input graphics for the vehicle motion setting include at least one of: a curvature input graphic, a directional input graphic, or a speed input graphic.

15. The mobile device of claim 13, wherein the input for the vehicle motion setting is based on an orientation of the mobile device.

16. The mobile device of claim 12, further comprising displaying on the display:
a vehicle graphic; and
a vehicle path graphic located at a front end and/or a back end of the vehicle graphic, wherein the vehicle path graphic is based on the input of the vehicle motion setting, wherein the input for the vehicle motion setting includes a curvature input, wherein the curvature input includes a trailer of the vehicle graphic, wherein the trailer is configured to be dragged left or right to provide a curvature setting.

17. The mobile device of claim 12, wherein the control input provides a speed input, wherein a speed setting is determined based on a measurement of pressure on the control input.

* * * * *